(12) United States Patent
Mahoney et al.

(10) Patent No.: US 7,194,413 B2
(45) Date of Patent: Mar. 20, 2007

(54) METHOD OF PROVIDING LOCALIZED INFORMATION FROM A SINGLE GLOBAL TRANSFORMATION SOURCE

(75) Inventors: Brian J Mahoney, Clive, IA (US); Steven L Colvin, Hawkeye, IA (US); Manish K Sharma, Alpharetta, GA (US)

(73) Assignee: Deere & Company, Moline, IL (US)

( * ) Notice: Subject to any disclaimer, the term of this patent is extended or adjusted under 35 U.S.C. 154(b) by 978 days.

(21) Appl. No.: 10/208,964

(22) Filed: Jul. 31, 2002

(65) Prior Publication Data

US 2004/0024603 A1 Feb. 5, 2004

(51) Int. Cl.
*G10L 21/00* (2006.01)

(52) U.S. Cl. .......................... 704/277; 704/270; 704/2; 704/1

(58) Field of Classification Search ................ 704/277, 704/1–10, 270–276
See application file for complete search history.

(56) References Cited

U.S. PATENT DOCUMENTS

| | | | |
|---|---|---|---|
| 5,714,946 A | 2/1998 | Gottshall et al. | |
| 6,714,857 B2 * | 3/2004 | Kapolka et al. | 701/123 |
| 6,982,635 B2 * | 1/2006 | Obradovich | 340/439 |
| 2001/0013047 A1 * | 8/2001 | Marques | 707/536 |
| 2002/0095454 A1 * | 7/2002 | Reed et al. | 709/201 |
| 2003/0097208 A1 * | 5/2003 | Doyle | 701/2 |
| 2004/0024656 A1 * | 2/2004 | Coleman | 705/27 |

* cited by examiner

*Primary Examiner*—Richemond Dorvil
*Assistant Examiner*—Qi Han

(57) ABSTRACT

A method of providing localized information from a single global transformation source, comprises collecting a plurality of information on a plurality of subjects, and conveying this information to a single information server located at the single global transformation source. Segregating the collected information into a plurality of sub-topics so that related information from a plurality of sources will be present in a single sub-topic. Transforming the information of each sub-topic into a single common language including conversion of words, exp-ressions, technical and financial data. Identifying each sub-topic by a topic identifier so that a localized user on the globe can identify the sub-topic germane to the needs and interest of the localized user. Transmitting the information of a sub-topic from the single information server to a local user who requests the same.

9 Claims, 8 Drawing Sheets

METHOD OF PROVIDING LOCALIZED INFORMATION FROM A SINGLE GLOBAL TRANSFORMATION SOURCE

FIELD OF THE INVENTION

The invention refers to providing information automatically collected on the earth, in the language and format that is requested by users anywhere in the world using a single information server.

BACKGROUND OF THE INVENTION

A typical method of providing information to local users is to provide an information service that is specific to each localized user group. In each locale or region of the world where a user group is located, a server is provided to disseminate and receive all information that is relative to that particular group. That localized server then transforms the information into appropriate language currently, unit of measure, date, time and numerical data of that user group. This system requires multiple servers to handle collected information for different areas of the world which is expensive, and which inhibits all user groups to have immediate access to all globally collected information.

Current Fleet Management systems have proven to be ineffective for Fleet Managers to manage their fleets. Fleet Managers manage their fleets with outdated and hand collected alert (fault) data that makes it hard for them to react to immediate alerts and plan for future fleet utilization based on their fleet's alerts. Different machines in the fleet need to create reports based on different parameters, attributes, and utilization values. The same hardware is used on any machine in the fleet. The machine must have its own configuration sent to it in order to know what proper parameters are to use to generate the attributes and utilization values specific to itself. The configuration must be able to be updated over the air without having to visit the machine if the configuration changes. The typical method of providing information to local users is to provide an information service that is specific to each localized user group. If each group has to have its own information service, the costs of global service made up of multiple individual services would be very high.

Therefore, the principal object of the present invention is to provide information which is automatically collected around the world and sent to a single information server, which then provides this information reformatted into the language, currency, numeric, unit of measure and date and time presentation. These and other objects will be apparent to those skilled in the art.

SUMMARY OF THE INVENTION

This invention deals with collecting information from a plurality of different sources; transmitting the same to a single global information server; segregating the collected information into a plurality of sub-topics, processing the sub-topic information into a common language; and providing a format for localized users of the information to identify the sub-topics and gain access thereto.

Information that is automatically collected specifically about fleets of agricultural machines is sent to a single global information service. This allows the only one information service to provide the same information to any user in the world with only one information service.

Information has characteristics depending upon the type of information. The types of information considered in the invention are: duration of engine usage; duration of usage of engine machine; type of machine; linear distance; linear velocity; rotational velocity; fluid volume; engine loading; crop yield by weight; crop yield by volume; geographic longitude; geographic latitude; universal time and date; switch position—two position; switch position—multi-position; temperature; area; and currency.

The individual information is stored in a single form in a single information server and can be presented as a completed group of information in the user's specific language, currency, numeric, unit of measure and date and time presentation.

The information taken from the vehicle being monitored is done by a plurality of sensors on the vehicle, such as through the Asset Vision® products of Wireless Link located at Milpitas, Calif.

DESCRIPTION OF THE INVENTION

The present invention provides information which is automatically collected around the world and sent to a single information server, and then provides this information reformatted and presented as a completed group into the language, currency, unit of measure, date, time and numerical data of that particular locale or user group. Specifically, information collected about fleets of agricultural machines, but not limited to, include the duration of usage of information is then sent to a single global information server.

The typical method of providing information to local users is to provide an information service that is specific to each localized user group. The present invention eliminates the need to provide multiple servers to handle information which in turn, provides a single global information server.

Figure 7:
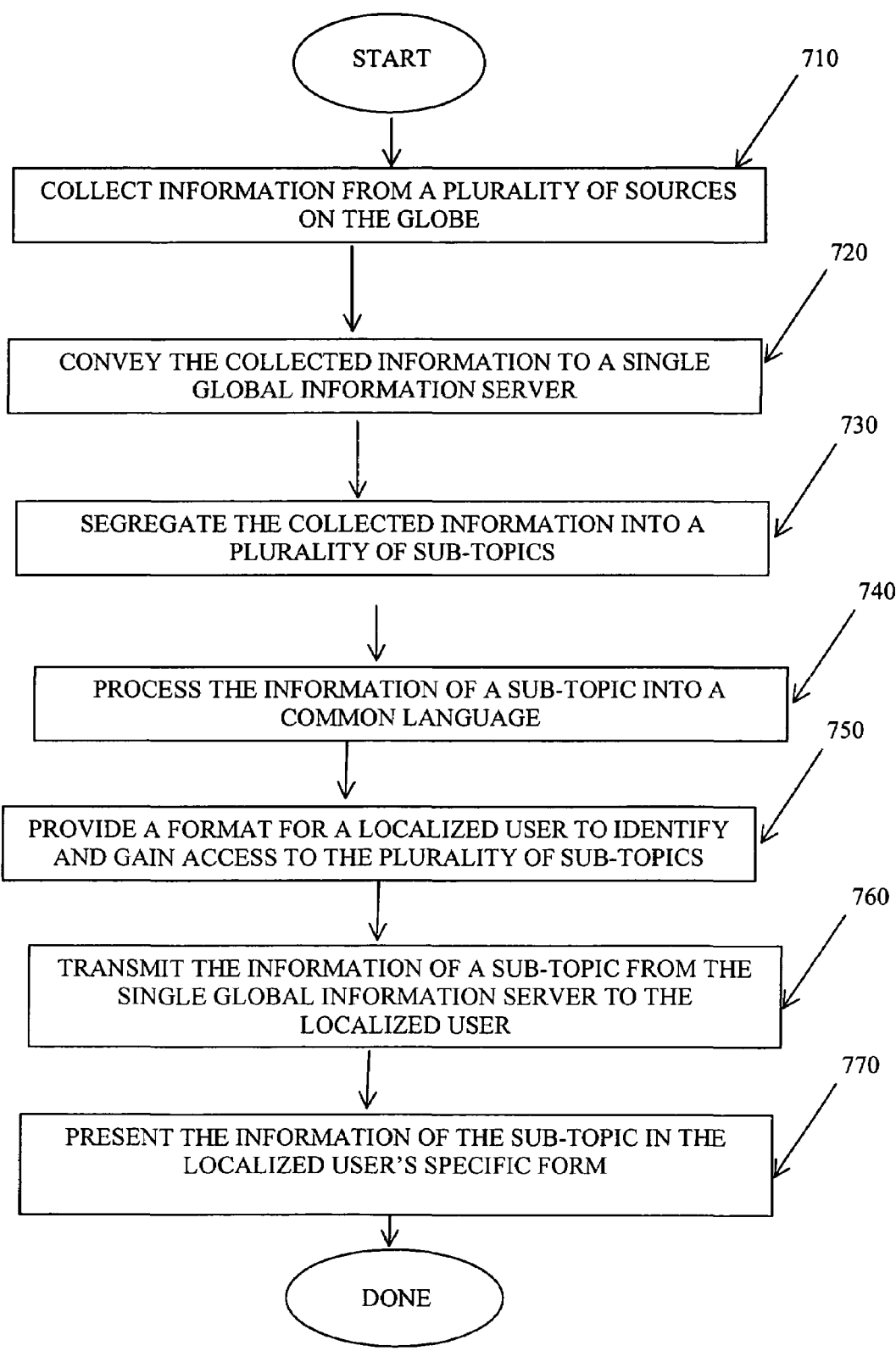
FIG. 7 is a flow diagram of a method of providing localized information from a single global transformation sources.
Figure 8:
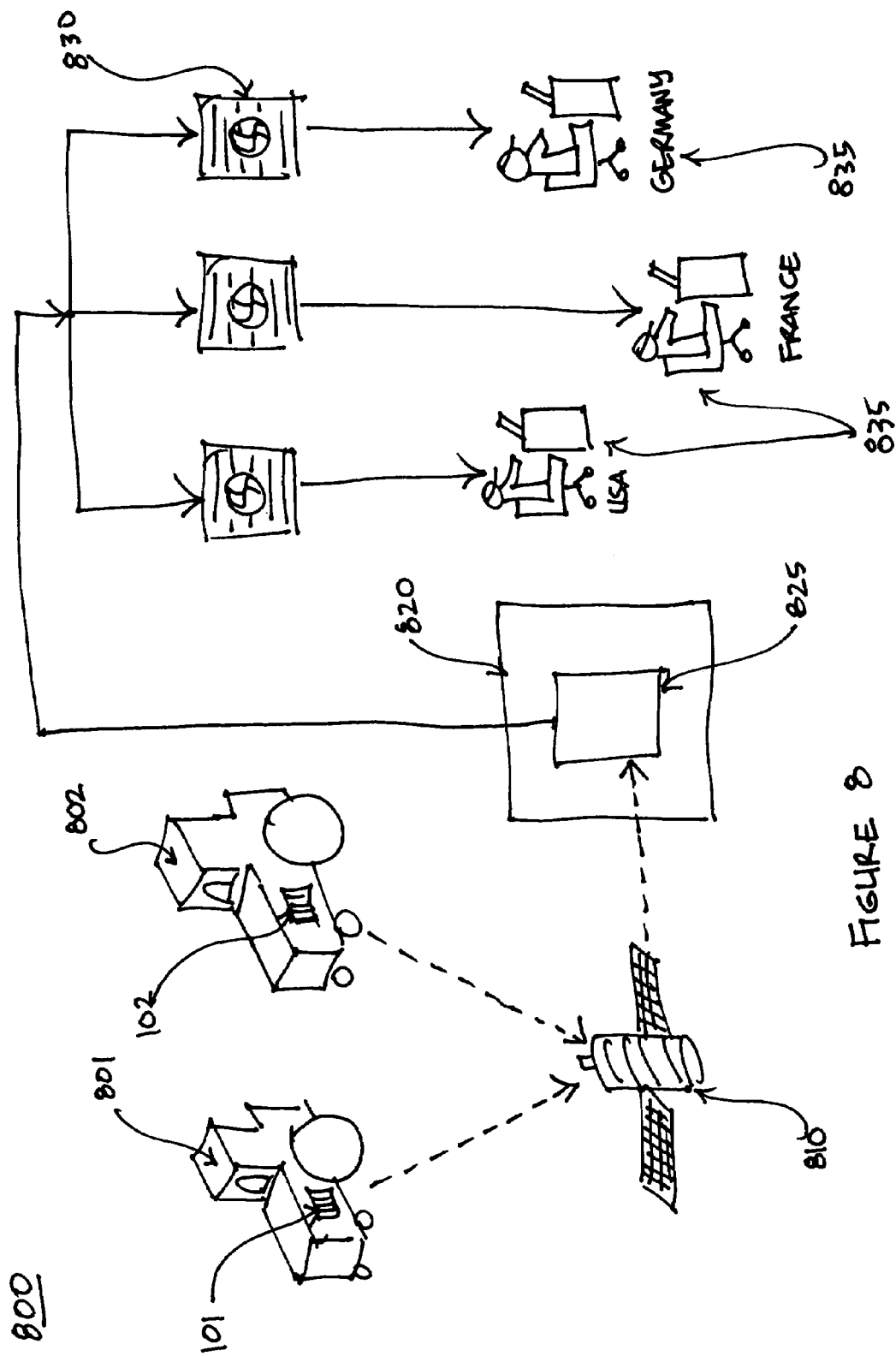
FIG. 8 is a schematic diagram of a system for providing localized information from a signal global transformation.

Referring to the method 700 of FIG. 7 and the system 800 depicted in FIG. 8, information is initially collected from a plurality of sources on the globe (710). In one embodiment of the present invention, the plurality of sources includes a fleet of farm field equipment (801, 802) located at a plurality of global positions. At step 720, this collected information is then conveyed to a single global information server (825) that is located at a single global transformation source (820). In one embodiment of the present invention, this collected information is conveyed via wireless means, for example a satellite connection (810).

At the single global information server (825), the collected information is segregated into a plurality of sub-topics (730), such that related information from a plurality of sources will be present in a given sub-topic. For example, in one embodiment of the present information, the types of information considered are: duration of engine usage; duration of usage of engine machine; type of machine; linear distance; linear velocity; rotational velocity; fluid volume; engine loading; crop yield by weight; crop yield by volume; geographic longitude; geographic latitude; universal time and date; switch position—two positions; switch positions—multi-position; temperature; area; and currency.

In other embodiments, the information collected from the plurality of sources comprises Red Alerts and Alert Log Reports automatically generated at the sources. Also, the information transmitted for a sub-topic can be selected as to its scope and detail varying among the urgent, summary, or snap shot focusing only on the current status of a subject.

The information of each sub-topic is processed into a single common language (740). In embodiments of the present invention, words, expressions, technical and financial data are transformed from the source language to the single common language. A format is provided for a localized user (835) of the collected information to identify and gain access to the plurality of sub-topics (750). In one embodiment of the present invention, providing this format includes identifying each sub-topic by a topic identifier so that a localized user on the globe can identify the sub-topic germane to the needs and interest of the localized user. Per the localized user's request, at step 760, the information contained in a sub-topic or sub-topics is transmitted from the single global information server (825) to the localized user (835). Finally, the information (830) from the requested sub-topic(s) is presented in the localized user's specific language, currency, numeric system, unit of measure and date and time presentation (770).

In one embodiment of the present invention, the localized user (835) is located at a global position remote from the location of the plurality of sources of information, i.e. the fleet of farm field equipment (801, 802). The transmitted information can be conveyed by wireless means, for example the satellite connection 810 depicted in FIG. 8.

Figure 1:
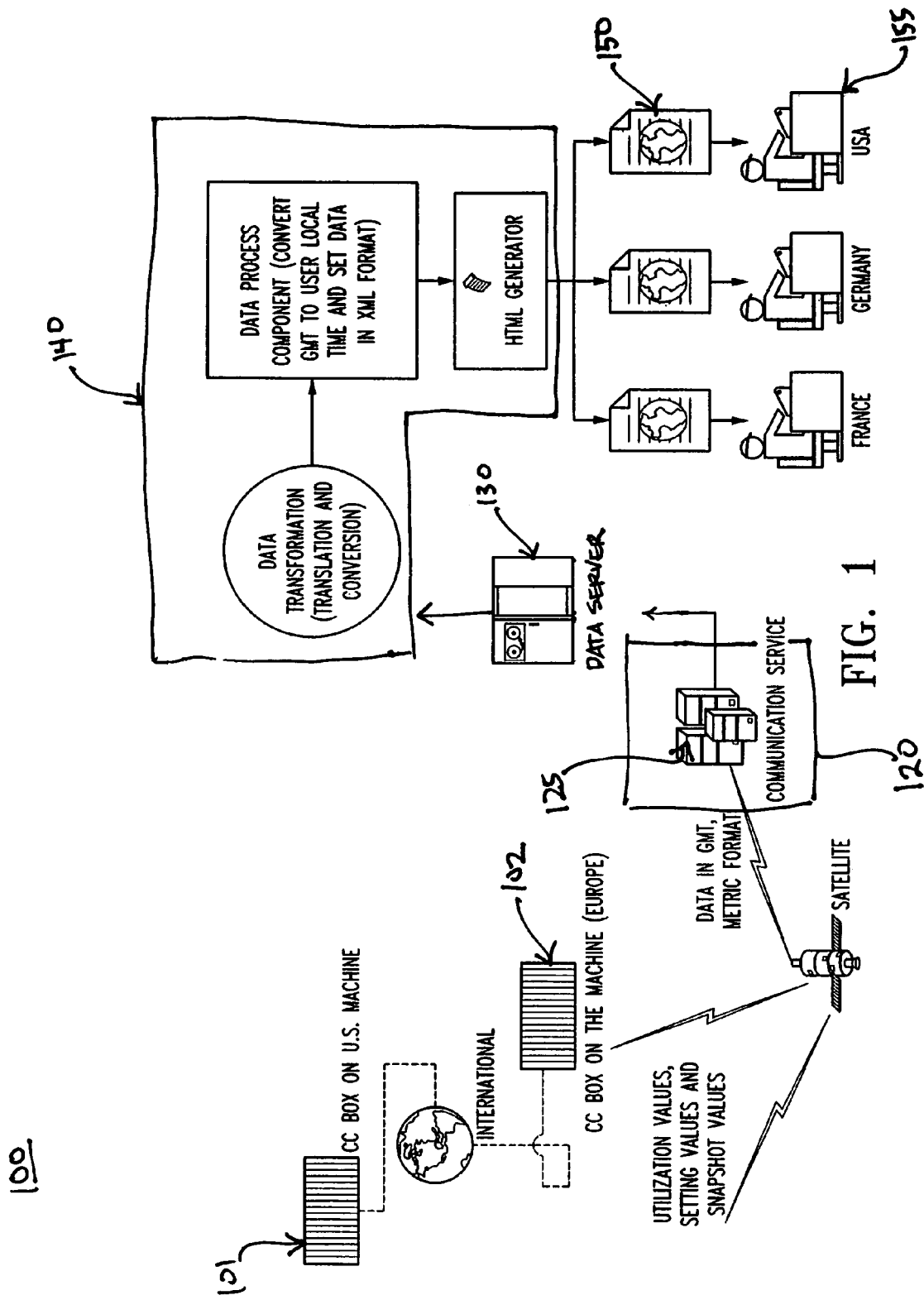
FIG. 1 is a flow sheet showing internationalization of machine data.
Figure 2:
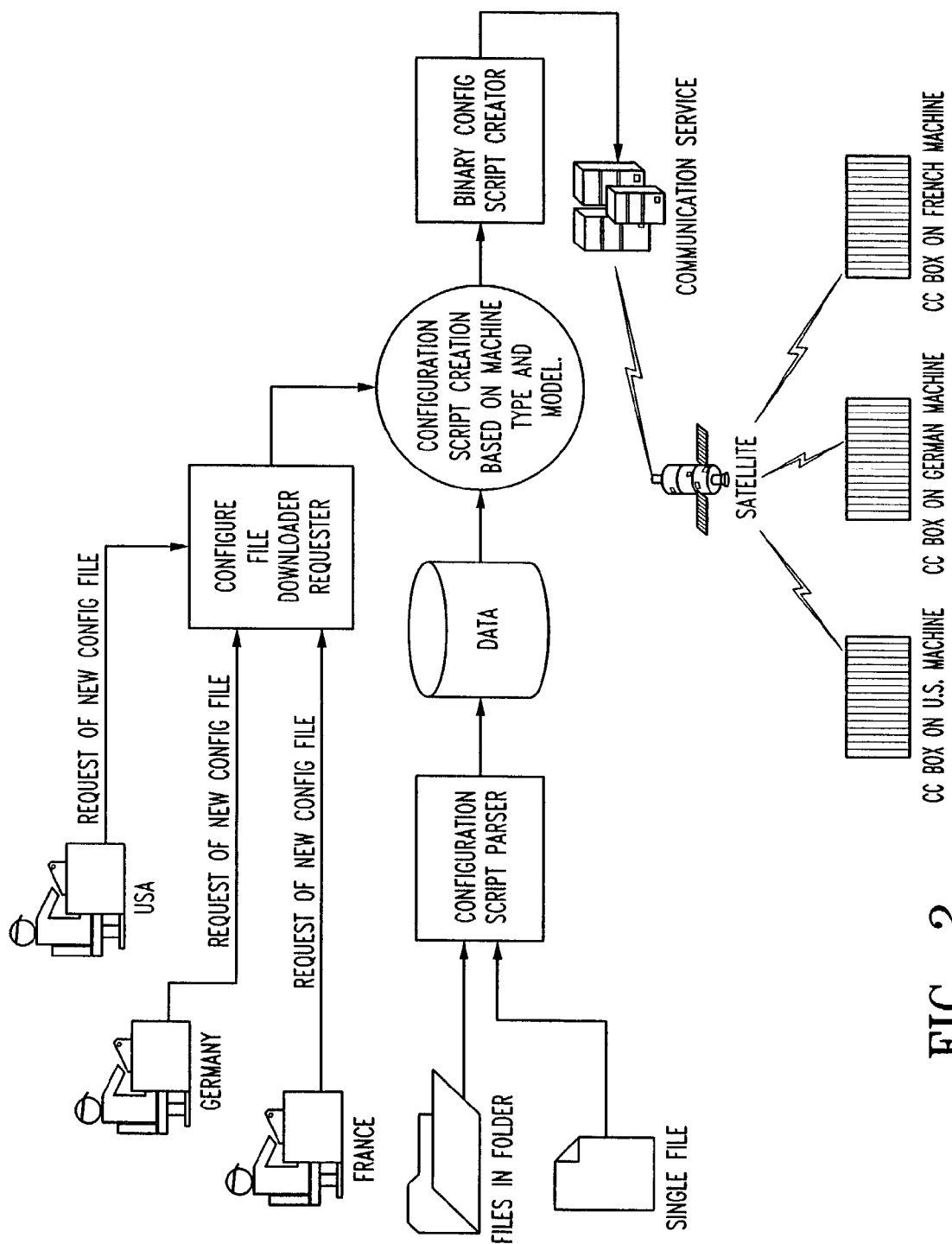
FIG. 2 is a flow sheet showing configuring the controllers for different machine types.
Figure 3:
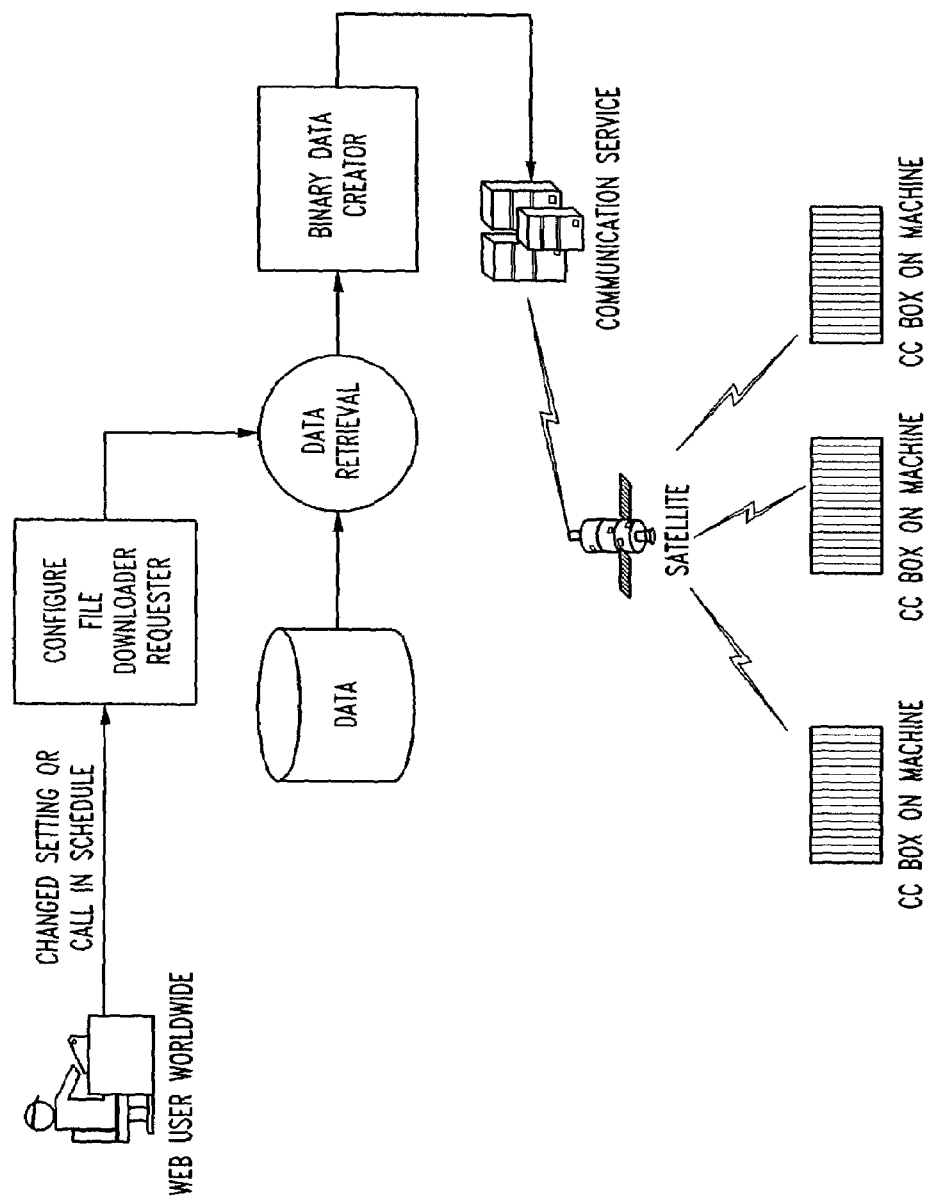
FIG. 3 is a flow sheet showing machine settings and call-in schedule.
Figure 4:
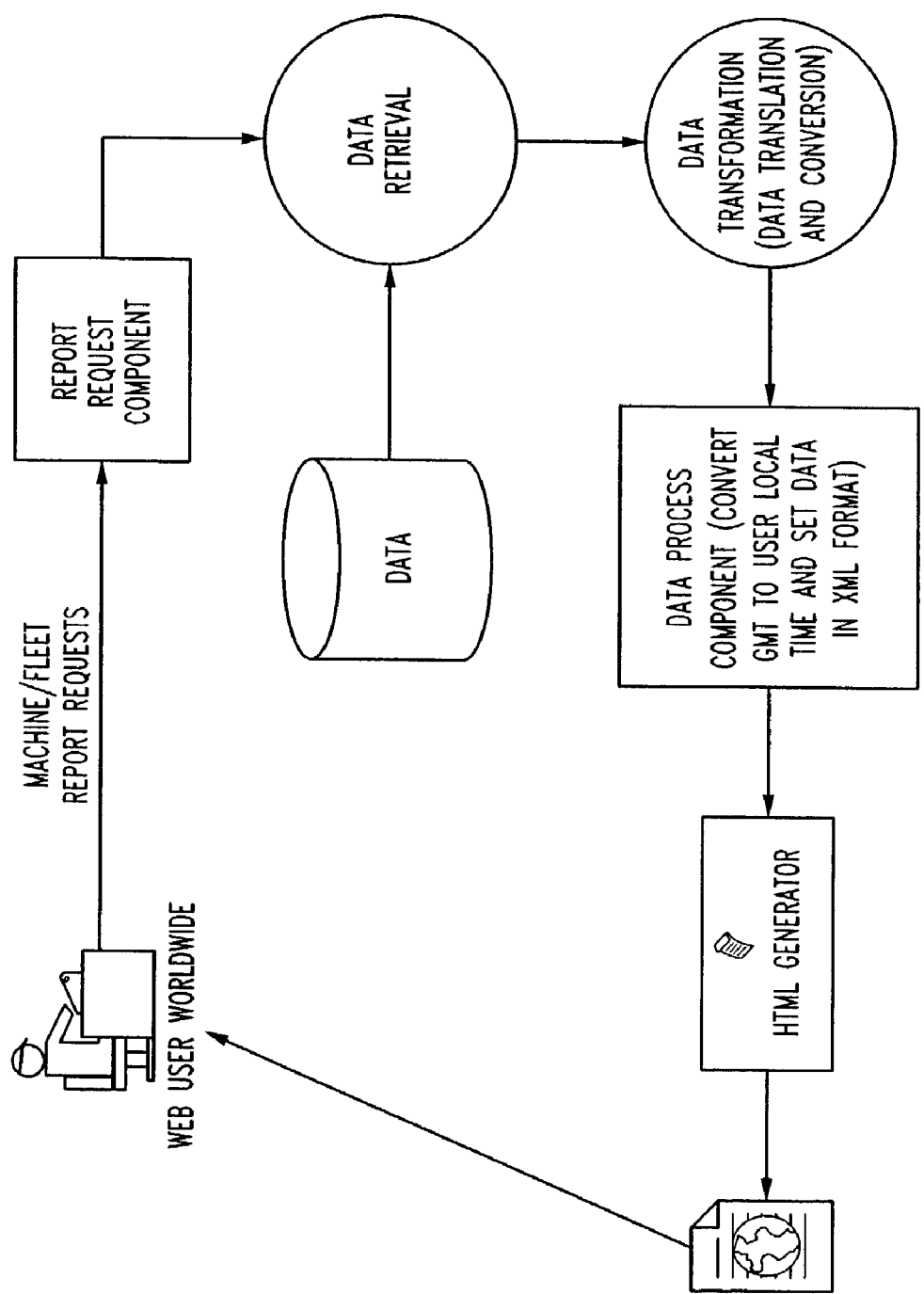
FIG. 4 is a flow sheet showing monitor machine information.
Figure 5:
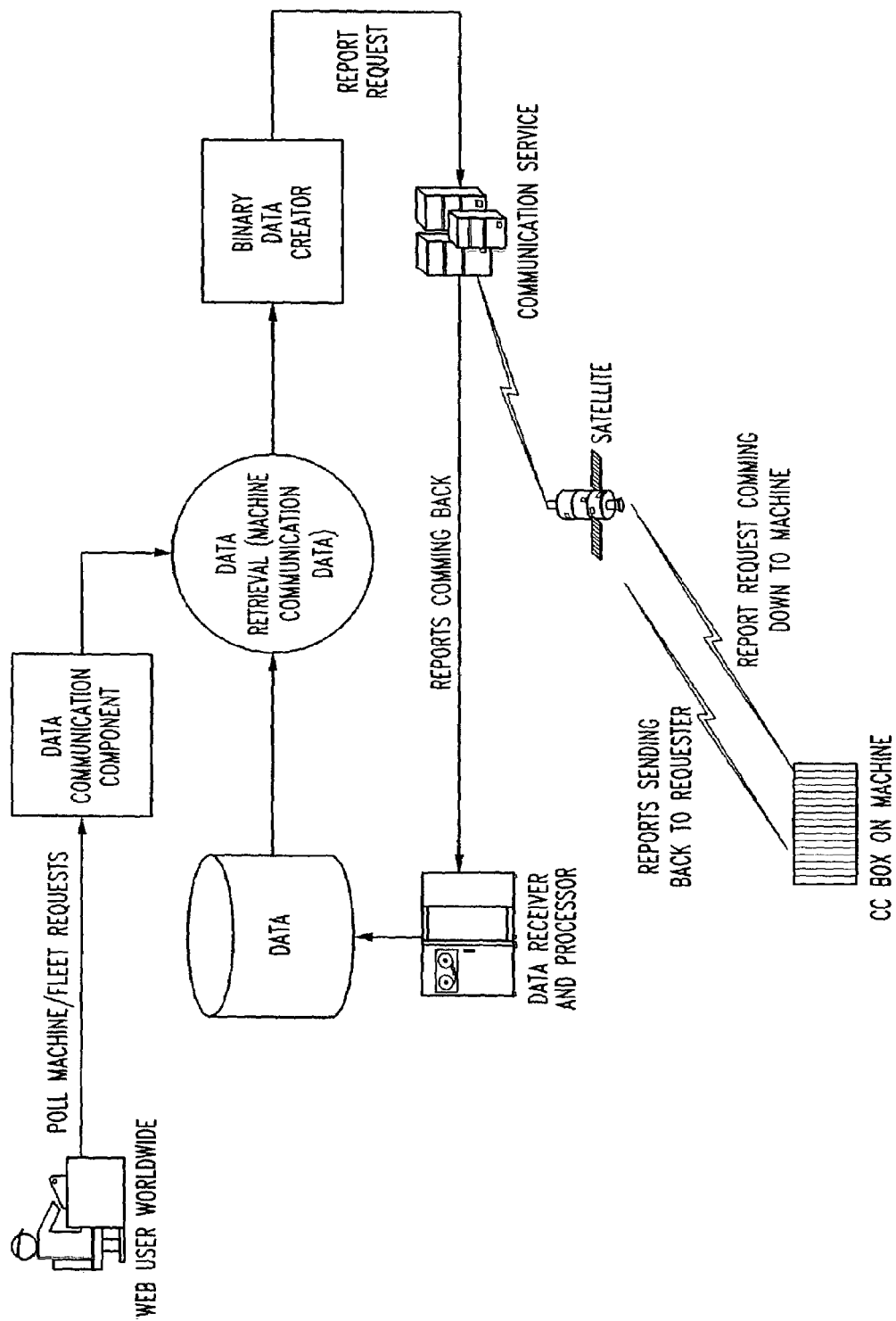
FIG. 5 is a flow sheet showing polling machine status.
Figure 6:
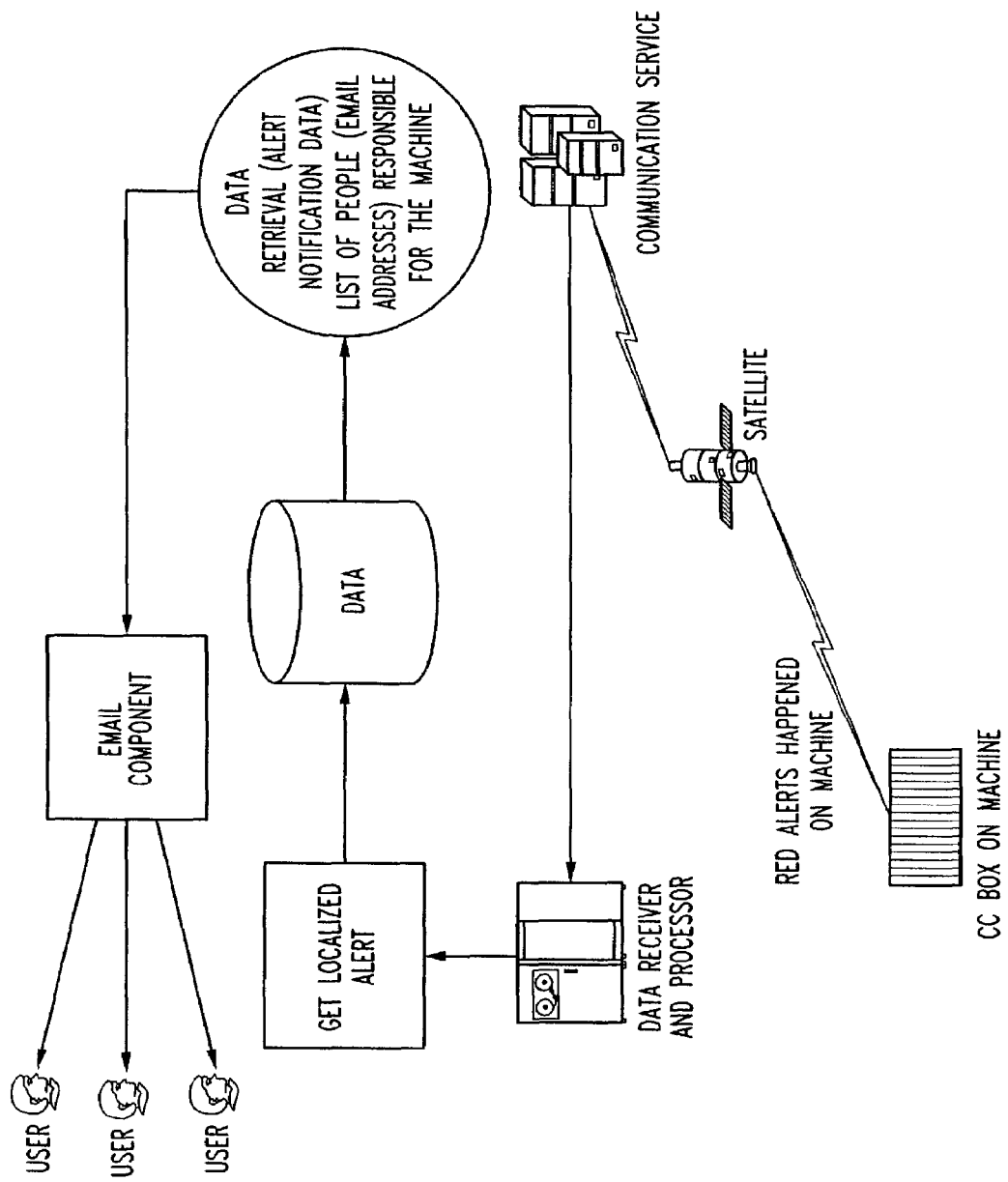
FIG. 6 is a flow sheet showing stop engine alert notification.

A more detailed depiction of the system 800 appears in FIG. 1. The system 100 is composed of: 1) the remote monitoring equipment for an information source. In one embodiment of the present invention, the information source is a plurality of agricultural machines, which is part of a fleet of agricultural machines located at a plurality of global positions. In another embodiment, the information source is a vehicle that is part of a fleet of vehicles located a plurality of global positions. The remote monitoring equipment comprises a communications controller/computer (101, 102) provided on the agricultural machine; one or more connections to the machine's data buses (CAN, CCD, R5232); other controllers on the machine which are connected to a machine data bus and to sensors and pass alert information derived from these sensors to the communications controller/computer (101, 102) which automatically generates and sends Red Alert and Alert Log Reports to the Central Information Server 120, and 2) the Central Information Server 120 comprising a Communications Server 125 which handles the over the air communication protocol to the remote agricultural machines communications controller/computer (101, 102) and the network communications to the Data Server 130, a Data Server 130 which accepts the Red Alert and Alert Log Reports from the agricultural machines and automatically sends Red Alert emails to a list of email addresses and when requested generates Alert Log reports and sends the reports to the Customer Service Application 140; and a Customer Service Application 140 which takes requests from a Fleet Manager via a network for an Alert Log report and passes the report request to the Data Server 130 and then displays the report 150 that comes from Data Server 130 to the Fleet Manager.

The primary feature of this system is the way in which the raw data is transferred throughout the system. Data, such as the configuration file, is transferred throughout this system using a method comprised of two different protocols, a low-level communication protocol that allows the Communication Controller (CC) to use a mobile asset management device to communicate to Communication Services (CS) and a high level connection based communication protocol, that transfers configuration data from the CS to the CC. The advantage of this latter protocol is the ability for both sides to actively communicate with each other as long as a connection is maintained.

Once a user requests a Customer Service Application configuration selection for a specific machine, the machine is then triggered causing information to be passed to Data Services (Database) to create the Configuration file. After the file is created, it is then passed via a message to Communications Services. Communications Services (CS) then calls the CC on the specific machine and transfers the Configurations file to the Communications Controller (CC) via an over-the-air protocol. An over-the-air protocol allows for direct configuration of the asset management device by CS.

When communication occurs between the CC and the CS a Snapshot/machine status report and an alert log if necessary, are then generated and sent to the user. This Snapshot/machine status report is sent each time to make sure that the data coming from the CC will be associated with the right configuration ID in the CC. When this report is sent, the date, time and position of the data become known. The configuration ID is essential at this point because, it is unique to each CC, it is used by the CS to track the configuration of the CC, and it is updated with each new configuration download to the CC.

The primary structure of the configuration file consists of different types of configuration records. These configuration records are essential because they help the CC to monitor information on the (CAN & CCD data) buses.

The configuration records that are sequentially transmitted includes, broadcast parameters, query parameters, attributes, utilization, snapshot, performance alert, machine state, call-in schedule and system configuration. These records are used to define to the CC how to acquire a parameter (data items which are available on the bus such as GPS speed, hitch position, time, etc.) that is being broadcast on the bus. The two types of parameters (Broadcast, Query) are used to define the items that are monitored on the CC, commonly known as Attributes. Attributes are monitored for collecting performance data, for generating current machine status (snapshot report/values) and for monitoring performance alerts. The machine status consists of the machine position, machine state (off, idle, working, transporting). Once Attributes are generated, they are then used to collect utilization reports, which transmits all complete reporting period data for duration of 1 hour.

It is therefore seen that this invention will achieve at least all of its stated objectives.

What is claimed is:

1. A method of providing localized information from a single global transformation source, comprising;

automatically collecting information from a plurality of agricultural machines, wherein the information comprises red alters and alert log reports automatically generated by the agricultural machines, and conveying this information to a single global information server located at the single global transformation source, segregating the collected information into a plurality of sub-topics so that related information from a plurality of sources will be present in sub-topic, processing the information of each sub-topic into a common language including conversion of words, expression, technical and financial data, providing a format for a localized user to identify and gain access to the plurality of sub-topics, and transmitting the information of the sub-topic from the single global information server to the localized user;

presenting the information of the sub-topic in the localized user's specific form.

2. The method of claim 1 wherein the information further comprises one or more of duration of engine usage, duration of usage of engine machine, type of machine, linear distance, linear velocity, rotational velocity, fluid volume, engine loading, crop yield by weight, crop yield by volume, geographic longitude, geographic latitude, universal time and date, switch position (two-position), switch position (multi-position), temperature, area and currency.

3. The method of claim 2 wherein the plurality of machines is a fleet of agricultural machines located at a plurality of global positions, wherein the localized user is located at a global position remote from the locations of the field equipment.

4. The method of claim 2 wherein the plurality of machines is a fleet of vehicles located at a plurality of global positions, wherein the localized user is located at a global position remote from the locations of the vehicles.

5. The method of claim 1 wherein the transmitted information is conveyed by a wireless means.

6. The method of claim 1 wherein the information transmitted for a sub-topic can be selected as to its scope and detail varying among the modes of urgent, summary, or snap shot focusing only the current status of a subject.

7. The method of claim 6 wherein the transmitted information is conveyed by wireless means.

8. The method of claim 1 wherein providing a format for a localized user to identify the and gain access to the plurality of sub-topics comprises identifying each sub-topic by a topic identifier so that a localized user on the globe can identify the sub-topic germane to the needs and interest of the localized user.

9. The method of claim 1 wherein the localized user's form includes language, currency, numeric data, unit of measure and date and time presentation.

* * * * *